United States Patent [19]

Snyder et al.

[11] Patent Number: 4,689,448

[45] Date of Patent: Aug. 25, 1987

[54] TWO-DIMENSIONAL POSITION COORDINATE DETERMINATION DEVICE WITH U-SHAPED DELAY LINE

[75] Inventors: Edward J. Snyder, Trumbull; Jamie L. Barbetti, Milford, both of Conn.

[73] Assignee: Summagraphics Corporation, Fairfield, Conn.

[21] Appl. No.: 764,835

[22] Filed: Aug. 9, 1985

[51] Int. Cl.[4] .......................... G08C 21/00; G01B 7/14

[52] U.S. Cl. ........................................ 178/19; 324/207

[58] Field of Search .................. 324/207, 208; 178/18, 178/19, 20; 33/1 M, 1 CC, 125 R, 125 W

[56] References Cited

U.S. PATENT DOCUMENTS 4,482,784 11/1984 Whetstone ............................ 178/19

4,514,688 4/1985 Whetstone .......................... 324/208

*Primary Examiner*—Reinhard J. Eisenzopf

*Assistant Examiner*—Walter E. Snow

*Attorney, Agent, or Firm*—Rosen, Dainow & Jacobs

[57] ABSTRACT

An automatic position coordinate determination device has a single U-shaped delay line made of magnetostrictive material. A grid network of electrical conductors including first and second pluralities of parallel conductors arranged substantially perpendicular to first and second coordinate axes respectively is inductively coupled to the delay line. A sensor coil is arranged at one end of the delay line for outputting a signal in response to the arrival of a propagating magnetostrictive strain wave induced by an energized electrical conductor. A movable flux-producing element is proximally arranged with respect to the grid network. When the flux-producing element is pulsed, at least one electrical conductor of each plurality is energized, which energized conductors in turn each induce a strain wave which propagates toward the sensor. The propagation times of the induced strain waves are processed to determine the position coordinates of the pulsed flux-producing element.

19 Claims, 11 Drawing Figures

TWO-DIMENSIONAL POSITION COORDINATE DETERMINATION DEVICE WITH U-SHAPED DELAY LINE

FIELD OF THE INVENTION

The invention relates to devices for determining the position coordinates of a pointer on the surface of a tablet. More specifically, the invention relates to two-dimensional position coordinate determining devices wherein each position coordinate of a pointer relative to a respective coordinate axis is determined by measuring the time of travel of a magnetostrictively induced strain wave along a magnetostrictive element from a point corresponding to the pointer position coordinate to a reference position at an end of the magnetostrictive element.

BACKGROUND OF THE INVENTION

It is known in the art of position coordinate determining devices, sometimes referred to as digitizers, to provide a construction which employs only a single length of a non-electrical signal propagation medium, i.e., a magnetostrictive medium, for each coordinate dimension and a respective grid comprising a plurality of spaced parallel electrical conductors, each conductor extending transversely from a point adjacent one of the magnetostrictive elements. Timing means are provided to enable measurement of strain wave travel time along each magnetostrictive element between a reference position and a position corresponding to the location of a pointer on the grid.

Such a digitizer is disclosed in U.S. Pat. 4,514,688, which teaches a construction for an automatic coordinate determining device having a tablet with a grid network of first and second sets of parallel spaced electrical conductors, which sets of conductors are mutually orthogonal. Each respective magnetostrictive element (i.e., wire) is situated with its axis transverse to the corresponding set of electrical conductors. A pointer is movably arranged adjacent the conductors. This pointer includes a flux-producing element which is inductively coupled to at least one conductor from each set of parallel conductors. When the flux-producing element is energized, an electrical current is induced in the proximal conductors, which current in turn induces a strain wave in the respective magnetostrictive element at a region adjacent the energized conductor. The magnetostrictive elements correspond respectively to the X and Y coordinate axes. The strain wave induced in the respective magnetostrictive element travels along the axis to a region of the magnetostrictive element where a sensor means is provided. The respective sensor means acts as a sensor for producing a signal in response to detection of the traveling strain wave induced as a result of energization of the pointer.

In addition, in U.S. Patent No. 4,514,688 a fiducial signal induction coil is provided at each end of both magnetostrictive elements. These fiducial signal induction coils are energized to produce strain waves prior to pulsing of the cursor. The fiducial signal induction coils are both energized to produce a pair of traveling strain waves along the magnetostrictive element, which strain waves are received by the sensor means at the end of the magnetostrictive element. The signals output by the sensor means upon detection of the respective strain waves are clocked to determine the time of travel separating the two strain waves. This detected time of travel is then compared with a reference value corresponding to a standard length of the magnetostrictive element. The difference between the detected time of travel and the reference value represents an error which must be compensated for. It should be noted that this calibration process takes place without energization of the flux-producing element. After storage of the value of error compensation required, the logic and control network energizes the flux-producing element of the pointer. The time of travel of the strain wave induced by the pointer is then determined. The latter time of travel for each magnetostrictive element represents the corresponding uncompensated coordinates of the pointer position. Following compensation, the true coordinates of the pointer position are output to data storage or display.

This prior art digitizer has the disadvantage that two magnetostrictive elements are provided for performing twodimensional position coordinate determination. Consequently, additional expense must be incurred in the manufacture of damping mounts and a sensor coil for each magnetostrictive element.

A further disadvantage lies in the fact that if the cursor is located in a corner of the active data tablet surface near where a sensor coil is arranged, pulsing of the cursor will directly induce a pulse in the sensor coil, which is in addition to the pulse induced by the propagating strain wave, unless heavy shielding is provided. In the absence of such shielding, the circuitry would be unable to accurately discriminate between the two pulses, i.e. the informational signal produced by the propagating strain wave and the non-informational signal induced directly by the cursor. This phenomenon is known as overloading.

SUMMARY OF THE INVENTION

It is the object of the invention to provide a digitizer of the above-described type having a single U-shaped magnetostrictive element serving as a delay line whereby the X and Y position coordinates of a pointer can be determined by sequential pulsing.

It is a further object of the invention to provide a digitizer which is relatively cheaper to manufacture than prior art digitizers of this type due to the elimination of the damping blocks and the sensor coil associated with the second magnetostrictive element (hereinafter referred to as the "delay line").

It is a third object of the invention to provide a digitizer of the above-described type wherein the problem posed by overloading (i.e. direct interaction between the cursor and the sensor coil) is eliminated.

It is a final object of the invention to provide a digitizer wherein the sensor coil need not be shielded from the flux-producing element since the pulse produced as a result of overloading will be recognized and masked by the control and logic circuitry.

The foregoing objects are achieved in accordance with the invention by inductively coupling two linear portions of a U-shaped delay line to respective mutually orthogonal pluralities of parallel electrical conductors and by inductively coupling a sensor coil to the end of a third portion of the U-shaped delay line. The pluralities of electrical conductors form a grid network in the data tablet, over the top surface of which a pointer having a flux-producing element is moved. When the flux-producing element is pulsed, a current pulse is induced in at least one proximal electrical conductor of each plurality. Each energized electrical conductor is turn induces a pair of oppositely propagating strain waves in the U-shaped magnetostrictive element at a point therealong, i.e. at a point along the first linear portion and at another point along the second linear portion respectively. One strain wave of each pair propagates toward the sensor coil, which outputs a pulse in response to detection of the arrival of each strain wave.

The first strain wave arrives at the sensor coil after propagating along a part of the second linear portion of the magnetostrictive element and along all of the third portion. The second strain wave arrives at the sensor coil after propagating along a part of the first linear portion and all of the second linear portion and all of the third portion. The time required for the first strain wave to propagate along the third portion represents an interval of time between the output of a pulse by the sensor coil due to overloading and the output of a pulse in response to detection of the first strain wave. This time interval eliminates the superposition of pulses caused by overloading in prior art digitizers so that the logic and control circuitry can distinguish between informational and non-informational pulses for purposes of position coordinate determination. The times of travel of the informational pulses, i.e. the pulses induced in the sensor coil by the propagating strain waves, are measured and then processed to determine the position coordinates of the pulsed pointer in accordance with an instruction program.

BRIEF DESCRIPTION OF THE DRAWINGS

The preferred embodiments of the present invention will be described in detail with reference to the following drawings, wherein.

DETAILED DESCRIPTION OF THE PREFERRED EMBODIMENTS

Figure 1:
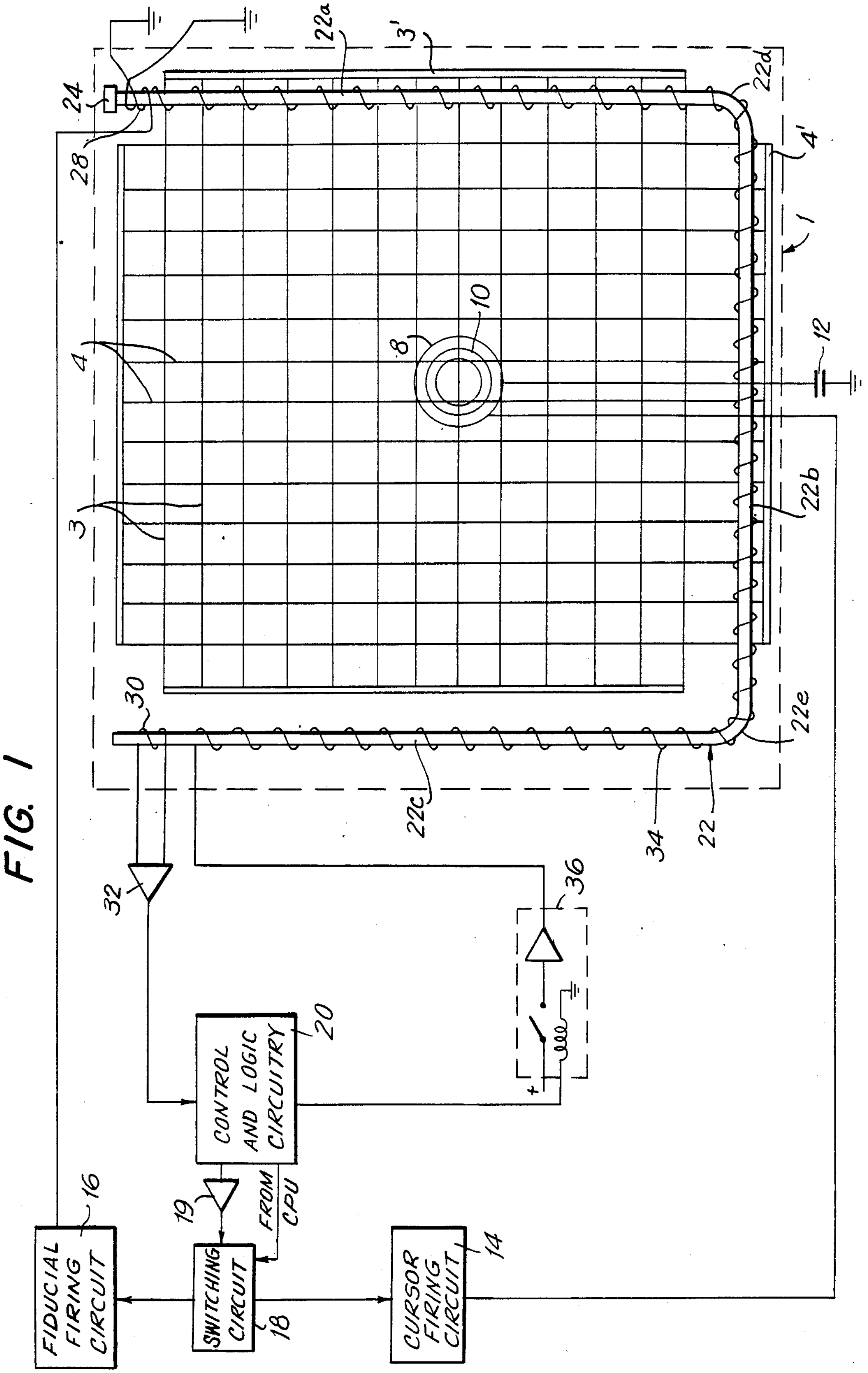
FIG. 1 is a plan view of the conductor grid, the U-shaped delay line, and the cursor with the logic and control network indicated in schematic form in accordance with the invention.

The improved digitizer of the present invention comprises a data tablet 1 having embedded beneath its top surface a PC grid 2 comprising a first plurality of parallel equidistantly spaced electrical conductors 3 and a second plurality of parallel equidistantly spaced electrical conductors 4 etched on a thin substrate as depicted in FIG. 1. As shown, the first plurality is substantially perpendicular to the second plurality. The ends of the parallel conductors 3 are respectively connected by conductors 3', while the ends of the parallel conductors 4 are respectively connected by conductors 4'.

It is well-known that an electrical current pulse can be produced in at least one of the electrical conductors 3 and in at least one of the electrical conductors 4 by positioning a pointer 8 having a flux-producing element 10 on the top surface of the data tablet in proximity to the electrical conductors and pulsing the flux-producing element. A current pulse will be induced in the proximal conductors in response to the pulsing of the flux-producing element 10. A current pulse in one of the conductors 4 will in turn induce a strain wave in the second linear portion **22*b* of a U-shaped delay line 22, consisting of magnetostrictive material, at the point along the delay line where the pulsed conductor 4 and the delay line 22 are in proximity. More exactly, the current pulse will induce oppositely propagating strain waves at the point of proximity. These oppositely propagating strain waves will travel toward the respective ends of the delay line 22. Likewise a current pulse induced in an electrical conductor 3 will in turn induce a pair of oppositely propagating strain waves at a point along the first linear portion 22*a* of delay line 22. A layer of insulating material (not shown in FIG. 1) will be arranged to form the outermost surfaces of the tablet, thereby electrically insulating the electrical conductors 3 and 4 from the pointer 8**.

The first and second linear portions **22*a* and 22*b* are connected by a curved portion 22*d* which enables the communication of propagating strain waves therebetween. The end of linear portion 22*a* is mounted in a damping block 24**.

A third portion **22*c* of the delay line 22 is connected to the second linear portion 22*b* by way of curved portion 22*e*. Although the third portion 22*c* is linear in the preferred embodiment, the shape of this portion is not crucial to the invention. Portion 22*c* may be replaced by any non-linear portion which is functionally equivalent. The end of third portion 22*c* extends in free space beyond the sensor coil 30 which circumscribes portion 22*c*** at a reference position near the end.

The pointer 8 (see FIG. 1) is freely movable over the top surface of the data tablet. This pointer can be either a stylus or a cursor, and includes a circular flux-producing element 10 having an axis normal to the plane of the conductors 3 and 4. The flux-producing element 10, as a result of its closely spaced proximity to the surface of the tablet, is inductively coupled to the individual conductors arrayed near the top surface of the tablet. The flux-producing element 10 acts as the primary of a transformer with each of the grid conductors 3 and 4 serving as secondaries. The flux-producing element 10 is connected in series with a power supply. The coil is momentarily grounded, which causes the existing field to collapse, thereby inducing a field of opposite polarity into the grid network of conductors. This induced field causes current to flow in the conductors located proximal to the flux-producing element.

The cursor is pulsed by cursor firing circuit 14, which is connected to one contact of switch 18. The other contact of switch 18 is connected to fiducial firing circuit 16 to be described in detail below. The switch is controlled by a signal received from CPU 74 (see FIG. 4) of the control and logic circuitry 20, which also outputs trigger pulses to firing circuits 14 and 16 by way of amplifier 19.

Figure 2A:
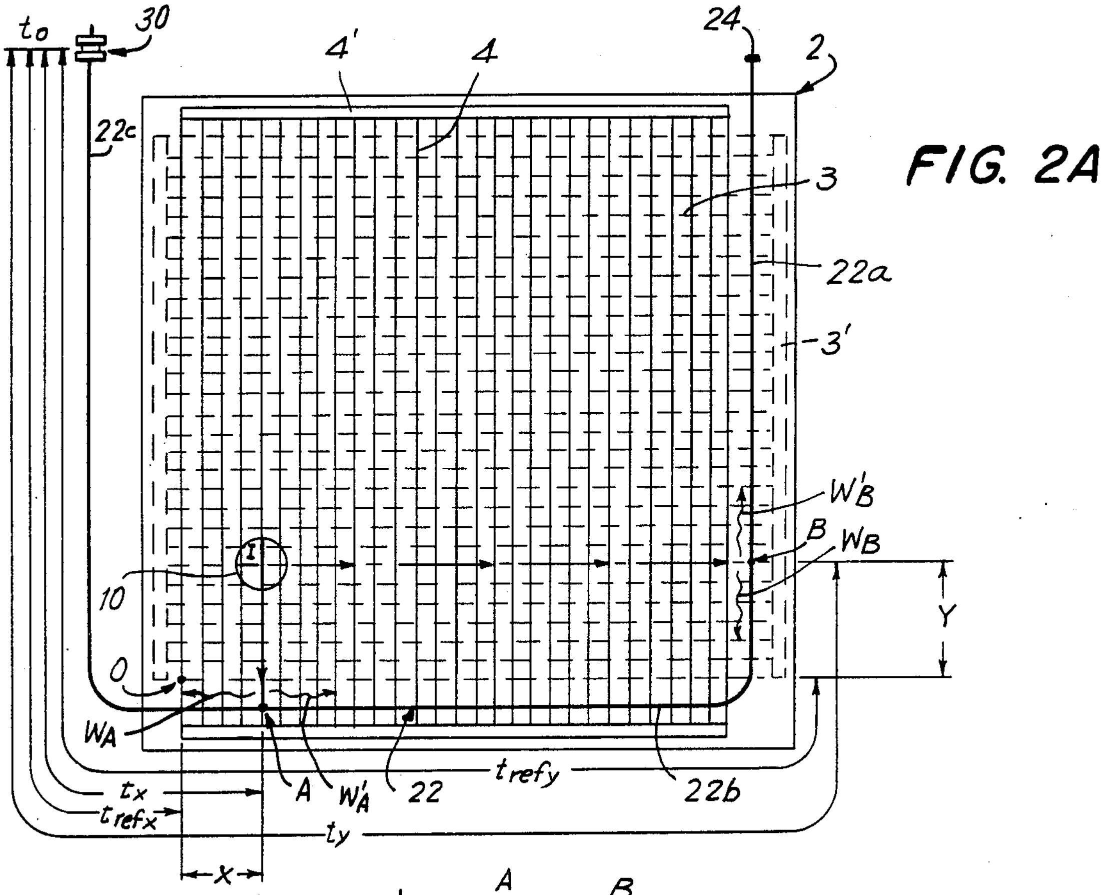
FIG. 2A is a plan view of the invention showing the coupling of the PC grid of conductors and the U-shaped delay line with the propagation times diagrammatically depicted.

FIG. 2A diagrammatically depicts the current pulses and strain waves induced in accordance with the invention. The fluxproducing element 10 is shown at position I=(X, Y) with the origin O located at the crossing point of the leftmost conductor 3. Upon pulsing of the flux-producing element, current pulses are induced in the electrical conductor 4 which is proximal to delay line 22 at point A and in the electrical conductor 3 which is proximal to delay line 22 at point B. These current pulses in turn induce respective pairs ($W_A$, $W_A'$ and $W_B$, $W_B'$) of oppositely propagating strain waves at points A and B. The strain waves $W_A$ and $W_B$ propagate along the U-shaped delay line 22 toward sensor coil 30. These strain waves are informational in the sense that their respective times of propagation are processed to determine the position coordinates (X, Y) of the pulsed pointer. The strain waves $W_A'$ and $W_B'$ propagate away from sensor coil 30 and toward damping block 24, where these waves are damped to prevent reflection from the end of delay line 22. These strain waves are non-informational in the sense that their respective times of propagation are not used to determine the position coordinates of the pulsed pointer.

As will be discussed in detail below, clocking means are provided for measuring the propagation time of each informational strain wave. In the preferred embodiment of FIG. 1, the respective propagation times of strain waves $W_A$ and $W_B$ are measured sequentially, i.e. the flux-producing element 10 is pulsed two times in sequence, with the propagation time $t_x$ of wave $W_A$ being measured following the first pulsing and the propagation time $t_y$ of wave $W_B$ being measured following the second pulsing. The values $t_x$ and $t_y$ are then processed by the control and logic circuitry 20 to obtain the coordinates X and Y. To perform this computation, the processing means (i.e. CPU 74 of FIG. 4) is provided with reference times $t_{refx}$ and $t_{refy}$ which are stored in memory (i.e. ROM 76 in FIG. 4). The values $t_{refx}$ and $t_{refy}$ represent the respective propagation times of strain waves induced by the leftmost electrical conductor 4 and the lowermost electrical conductor 3 under standard conditions. As will be discussed in greater detail below, the times $t_x$ and $t_y$ are adjusted in accordance with a ratiometric proportionality to compensate for temperature effects using the propagation time of the fiducial-induced strain wave. The corrected values $t_{corx}$ and $t_{cory}$ obtained from this ratiometric proportionality represent the hypothetical times of propagation of strain waves $W_A$ and $W_B$ under standard conditions. The position coordinates X and Y are then determined by the processing means in accordance with the following relationships:

$$X = V_{prop}\,(t_{corx} - t_{refx}) \quad (1)$$

$$X = V_{prop}\,(t_{cory} - t_{refy}) \quad (2)$$

where $V_{prop}$ is the speed of propagation of the strain waves in the uniform magnetostrictive medium of the delay line.

Figure 2B:
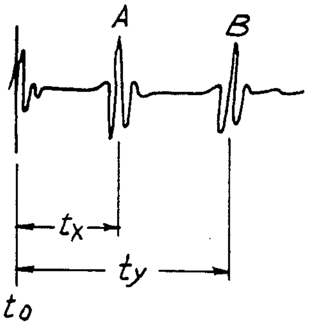
FIG. 2B is a graphical representation of the sensor coil output versus time.
Figure 3:
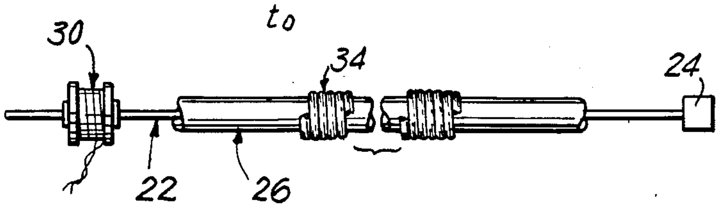
FIG. 3 is a view of a portion of the delay line with the shielding partially cut away and only a portion of the encircling coil depicted.

FIG. 3 shows the delay line 22 and associated components in greater detail. One end of the delay line 22 is supported by damping block 24 and the other end of the delay line extends freely beyond the sensor coil 30. It should be noted that the delay line is supported in close proximity or in physical contact with, but does not make electrical contact with, the electrical conductors 3 and 4. The delay line 22 is formed from any composition which exhibits magnetostrictive properties, for example, a nickel-chromium-vanadium or iron-cobalt-vanadium alloy. Upon induction of an electrical current through any of the electrical conductors 3 and 4 by flux-producing element 10, the resulting electrical magnetic field in the region where the energized conductors are proximate to the delay line 22 generates vibration or strain waves in the delay line. A first pair of strain waves propagate along the axis of the delay line 22 in opposite directions from the point which is proximal to the pulsed conductor 3 (point B in FIG. 2) and a second pair of strain waves propagate from the point proximal to the pulsed conductor 4 (point A in FIG. 2). The delay line 22 is sheathed in an elongated tubular jacket or sleeve 26 which is preferably made of a low-friction material. Teflon has been found to be a material suitable for sheathing the delay line 22 without substantial damping of the magnetostrictively induced strain waves.

At a predetermined position at the end of the third portion 22*c* of the delay line 22 there is provided an inductive sensor coil 30 which circumscribes the delay line 22 and which is connected to the inputs of the preamplifier 32 (see FIG. 1). The sensor coil 30 and the preamplifier 32 form a circuit for outputting an electrical signal (i.e. an amplified pulse) in response to detection of the arrival of a propagating strain wave at this point along the delay line 22. Alternatively, the inductive sensing coil can be replaced by a piezoelectric element.

The entire length of the sheath or jacket 26 is wrapped within a conducting helical bias coil 34 preferably formed from a good conductor such as copper. One end of the bias coil 34 is connected to the output of a bias signal generator 36 (see FIG. 1). The opposite end of the bias coil is connected to ground. Application of a bias signal from the generator 36 to the bias coil 34 sets up an electromagnetic field around the delay line which restores the delay line 22 to an initial operating condition and compensates for hysteresis or other external effects which can cause the delay line 22 to vary in its strain wave propagational response to an electric current induced in the conductors. Biasing of the delay line 22 takes place before the pointer measurement cycle is initiated. The biasing operation may be performed before each measurement cycle or periodically between groups of several measurement cycles. The biasing can be done independently of the timing of the measurement signals.

Figure 4:
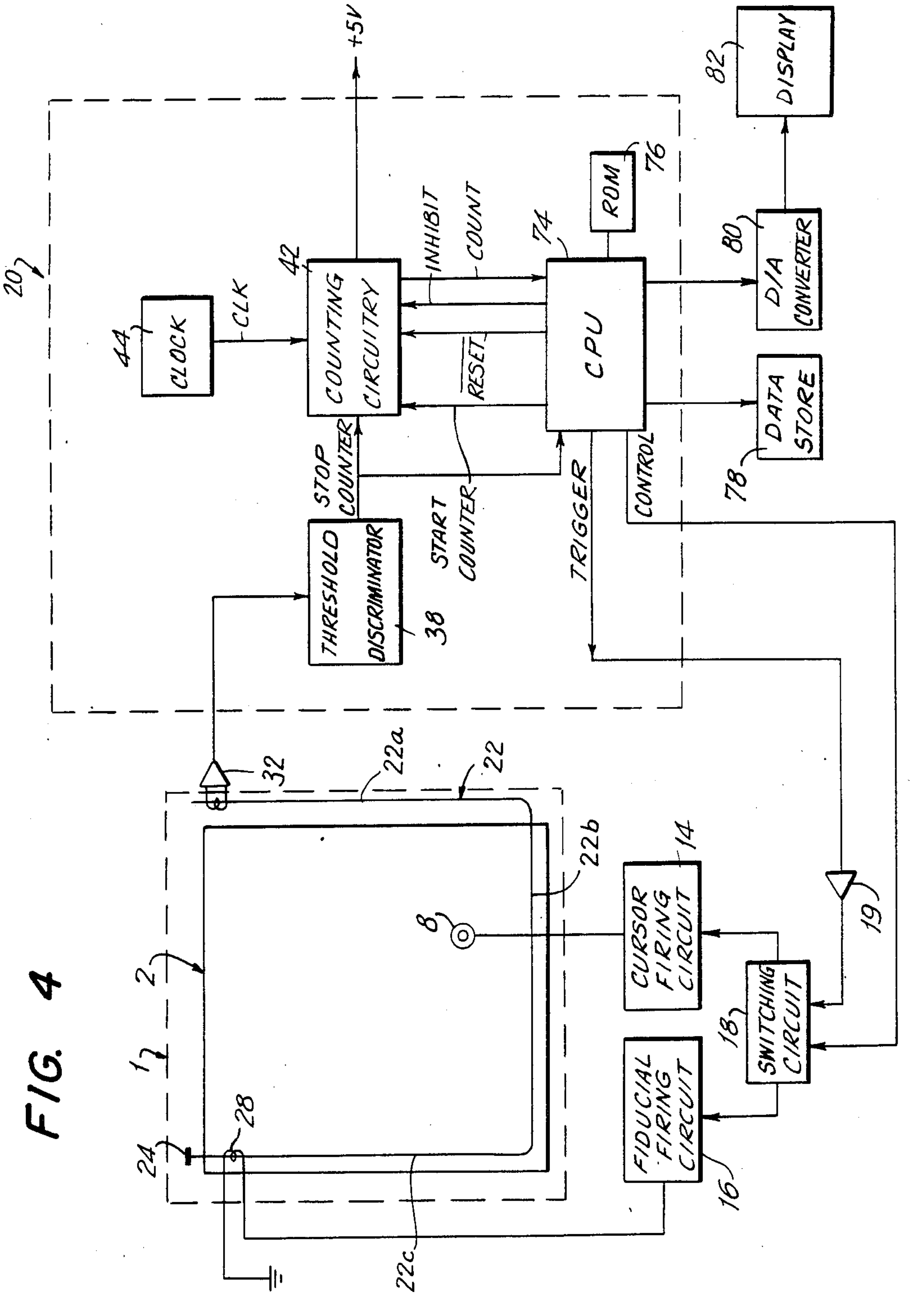
FIG. 4 is a schematic block diagram of the electrical circuitry suitable for sequential coordinate determination in accordance with the present invention.

The arrangement as depicted in FIG. 4 is suitable for sequentially determining the position of pointer 8 with respect to a pair of mutually orthogonal coordinate axes. When the flux-producing element 10 of pointer 8 is pulsed, a current pulse is induced in at least one of the horizontal electrical conductors 3 and at least one of the vertical electrical conductors 4. As previously described, each current pulse in turn induces a pair of oppositely propagating strain waves in the U-shaped delay line 22. Because the speed of propagation of each induced strain wave until detection by the sensor coil 30 remains constant, the time of propagation of the first and second strain waves ($W_A$ and $W_B$ in FIG. 2) can be determined and then used to calculate the corresponding position coordinate of the pointer.

As will be discussed in greater detail below, the cursor firing circuit 14 produces a pulse in the flux-producing element 10 in response to a trigger signal from the control and logic circuit 20, by way of amplifier 19, when switch 18 is in the cursor firing position. The control and logic circuit 20 comprises a counter 42 (see FIG. 4) which begins to count simultaneously with the firing of the cursor (i.e. simultaneously with the output of the TRIGGER signal) and which stops counting in response to the output of a signal by the preamplifier 32, indicating arrival of a strain wave induced in delay line 22. The counter 42 will be described in detail in connecton with the discussion of FIG. 5. In the embodiment depicted in FIG. 4, a pair of TRIGGER signals are output sequentially as previously described and the counter 42 is controlled to stop counting in response to detection of the first strain wave to arrive following the first TRIGGER signal and in response to detection of the second strain wave to arrive following the second TRIGGER signal. Each count represents the propagation time of the cursor-induced strain wave from the point of induction to the point at which the sensor coil is positioned. The counts are used to determine the respective position coordinates of the pulsed pointer. The counting rate of the counter is controlled by a clock 44 of predetermined frequency.

Circumscribing the delay line 22 at a predetermined reference position near the end of the first linear portion is a fiducial signal generating induction coil 28. This fiducial coil is connected to the fiducial firing circuit 16. The fiducial coil 28 serves to induce a strain wave in delay line 22 which will propagate toward the opposite end of the delay line and be sensed by sensor coil 30 situated thereat. The pulsing of the fiducial coil 28 will take place prior to the pulsing of the flux-producing element 10. As will be described in greater detail below, the counter 42 is started at the time the fiducial coil 28 is fired and is then stopped upon arrival of the fiducial-induced strain wave at the sensor coil 30. The time of propagation of the strain wave induced by the fiducial coil 28 can be used to automatically calibrate the digitizer whereby temperature effects can be compensated for. The fiducial firing circuit 16 will pulse the fiducial coil 28 in response to a TRIGGER signal output by CPU 74 of control and logic circuit 20, by way of amplifier 19, when switch 18 is in the fiducial firing position. Thus, switch 18 can be used to control the firing of the fiducial coil 28 and the flux-producing element 10 in alternating sequence. The condition of switch 18 is determined by a CONTROL signal output by CPU 74.

Under standard temperature conditions a strain wave induced by the fiducial coil 28 will propagate for a predetermined amount of time before arrival at the sensor coil 30. The known propagation time under standard conditions can be compared with the propagation time of the fiducial-induced strain wave under actual conditions to determine whether a correction is required to compensate for temperature effects. This correction can be performed in a known way in accordance with the following ratiometric proportionality:

$$t_{std}/t_{fid}=t_{cor}/t_{cur} \quad (3)$$

where $t_{std}$ is the time of propagation for the fiducial-induced strain wave under standard conditions, $t_{fid}$ is the propagation time of the fiducial-induced strain wave under actual conditions, $t_{cur}$ is the propagation time of the cursor-induced strain wave under actual conditions, and $t_{cor}$ is the corrected propagation time representing the theoretical propagation time of the cursor-induced strain wave under standard conditions.

In the preferred embodiment of the control and logic circuit 20 for sequential coordinate determination in accordance with the invention, the strain wave is detected by the sensor coil 30 and then amplified by the preamplifier 32. The amplified pulse is then applied to threshold discriminator 38 as depicted in FIG. 4. The threshold discriminator operates to sense the first zero crossing after the achievement of a minimal threshold and to provide an output pulse corresponding to the occurrence of the zero crossing. The output of the threshold discriminator 38 serves as a STOP COUNTER signal, which is output to the counting circuit 42. Clock 44 simultaneously outputs clocking (CLK) signals to counting circuit 42.

A first TRIGGER signal output by CPU 74 will pulse the flux-producing element 10 when switch 18 is in the cursor firing position, with the result that a first amplified pulse will be output by preamplifier 32. A second amplified pulse will be output by the preamplifier 32 in response to a second TRIGGER signal from CPU 74. The counter is suitably controlled such that after the first TRIGGER signal, the first amplified pulse serves as the STOP COUNTER signal, but after the second TRIGGER signal, the second amplified pulse serves as the STOP COUNTER signal. By using this sequential pulsing method, the number of elements comprising logic and control circuit 20 can be reduced.

Figure 6:
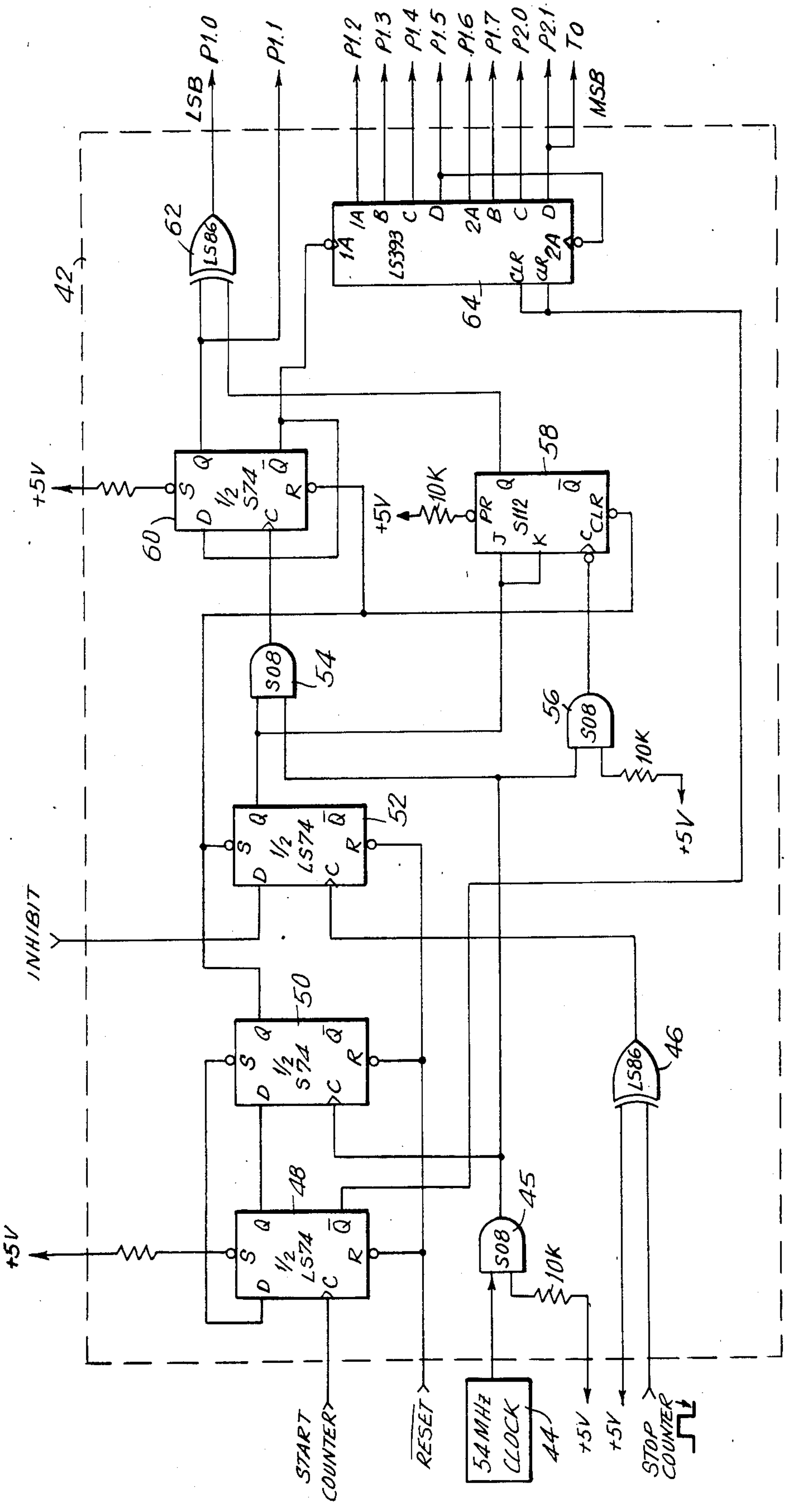
FIG. 6 is a detailed circuit diagram of the counting circuit schematically depicted in FIG. 4.

In accordance with the embodiment depicted in FIG. 4, the CPU 74 will output a START COUNTER signal simultaneously with the output of each TRIGGER signal. Following the output of the first TRIGGER signal, the pointer will be pulsed and preamplifier 32 will output first and second amplified pulses which will be passed to threshold discriminator 38, in response to which respective STOP COUNTER signals will be output to counting circuit 42. The counting circuit 42 will stop counting in response to the first STOP COUNTER signal, with the second STOP COUNTER signal having no effect. This first count will then be output to CPU 74 and temporarily stored in random access memory therein. CPU 74 will then output a RESET signal to counting circuit 42 for resetting the count to zero. A second TRIGGER signal will then be output by CPU 74 simultaneously with a second START COUNTER signal, following which respective STOP COUNTER signals will be output by threshold discriminator 38 in response to the first and second amplified pulses output by preamplifier 32. This time, however, the counting circuit will continue to count until the second STOP COUNTER signal is received. In this case, as shown in FIG. 4, the CPU 74 outputs an INHIBIT signal to counting circuit 42 during the time when the first STOP COUNTER signal is received. This INHIBIT signal renders the first STOP COUNTER signal ineffective. As depicted in FIG. 6, the INHIBIT signal is output to the D terminal of latch 52 while the STOP COUNTER signal is output to the C terminal of latch 52. In response to the first STOP COUNTER signal, the CPU 74 terminates the output of the INHIBIT signal so that the second STOP COUNTER signal will be effective, thereafter stopping the count in counting circuit 42. This second count will be output to CPU 74. CPU 74 will then process the first and second counts stored in random access memory, in accordance with a routine stored in ROM 75, to determine the position coordinates of pulsed pointer 8. This routine will reflect the geometric relations between the U-shaped delay line and the grid network.

In addition, the CPU 74 will be programmed to output an INHIBIT signal during times $t<t_{refx}$ so that the counting means will not stop counting in response to a sensor coil pulse induced directly by the pulsed pointer at time $t_0$ (see FIG. 2B).

Figure 5:
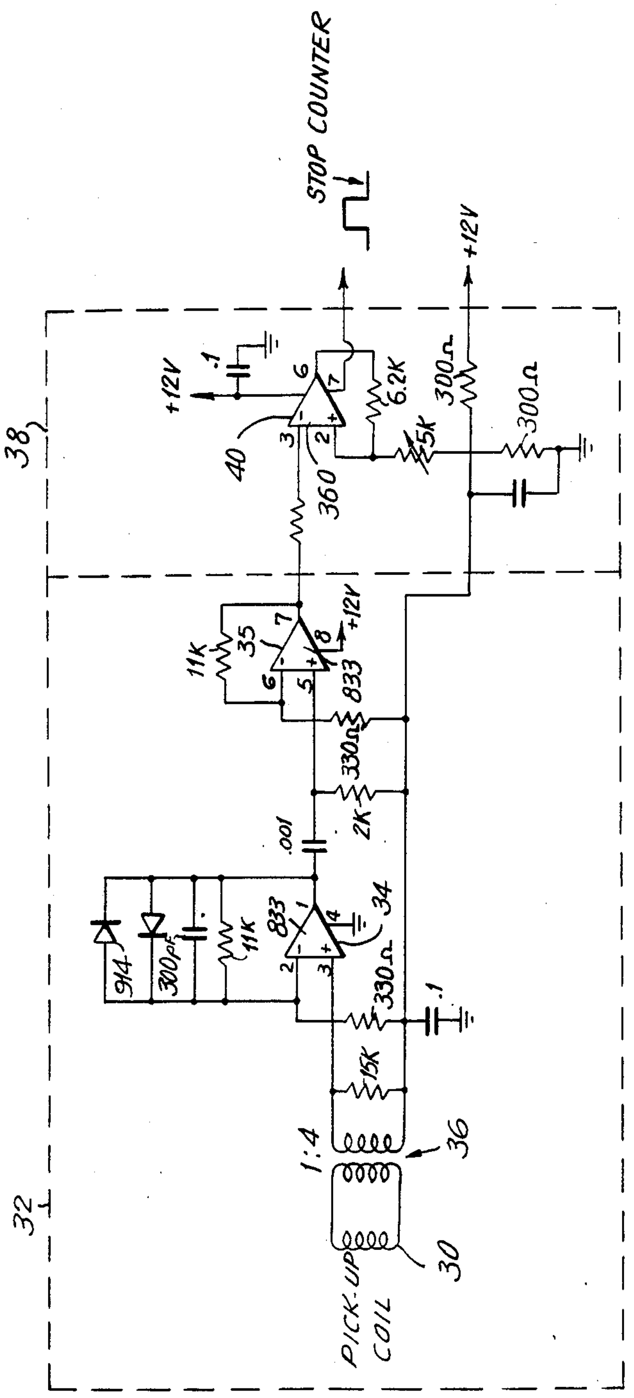
FIG. 5 is a detailed circuit diagram of the preamplifier and threshold discriminator schematically depicted in FIG. 4.

FIG. 5 shows the detailed circuitry comprising preamplifier 32 and threshold discriminator 38. Preamplifier 32 comprises a 1:4 transformer 36 connected across the terminals of sensor or pick-up coil 30. A 15-kiloohm resistor is connected across the output terminals of transformer 36. One terminal of the transformer secondary is directly connected to the plus terminal of operational amplifier 34. The other terminal of the transformer secondary is connected to the minus terminals of operational amplifiers 34 and 35 by way of respective resistors. The output terminal of operational amplifier 34 is connected to the plus terminal of operational amplifier 35 by way of a capacitor. Pre-amplifier 32 operates such that operational amplifier 35 outputs an amplified analog signal in response to the induction of a pulse in sensor coil 30. This analog signal is converted into a digital pulse by threshold discriminator 38, which comprises a comparator 40. Threshold discriminator 38 operates to output the STOP COUNTER signal in response to the receipt of an analog signal from preamplifier 32 which equals or exceeds a predetermined voltage level.

One embodiment of the counting circuit 42 is shown in FIG. 6. Counter circuit 42 comprises three D latches 48, 50 and 52 having reset terminals which are connected to receive the RESET signal from CPU 74. The C terminal of latch 48 is connected to receive the START COUNTER signal from CPU 74. The D terminal of latch 52 is connected to receive the INHIBIT signal from CPU 74, while the C terminal of latch 52 is connected to receive the STOP COUNTER signal by way of AND gate 46. A 54-MHz clock 44 outputs clocking signals to the C terminal of latch 50 and to an input terminal of AND gate 54 by way of AND gate 45. The other input terminal of AND gate 54 is connected to the Q terminal of latch 52. The output terminal of AND gate 54 is in turn connected to the C terminal of latch 60. The Q terminal of latch 60 is connected to an input terminal of EXCLUSIVE OR gate 62, while the Q terminal is connected to the D terminal of latch 60 as well as to the dual binary counter 64. The other input terminal of EXCLUSIVE OR gate 62 is connected to the Q terminal of JK flip-flop 58. The J and K terminals of flip-flop 58 are connected to the Q terminal of latch 52, the C terminal of flip-flop 58 is connected to the output terminal of AND gate 56, and the clear terminal of flip-flop 58 is connected to the Q terminal of latch 50. The input terminals of AND gate 56 are respectively connected to the output terminal of AND gate 45 and to a +5-volt voltage source by way of a 10-kiloohm resistor. Counting circuit 42 begins to count in response to the START COUNTER signal received by latch 48. The counting rate is determined by the frequency of clock 44. The counting circuit 42 stops the count in response to the receipt of a STOP COUNTER signal by EXCLUSIVE OR gate 46, the output terminal of which is connected to the C terminal of latch 52, provided that the D terminal of latch 52 is not enabled by an INHIBIT signal from CPU 74. Counting circuit 42 then outputs a plurality of bits representing the count to the CPU 74, with the output of EXCLUSIVE OR gate 62 representing the least significant bit (LSB) and the output of the 2D terminal of dual binary counter 64 representing the most significant bit (MSB).

Figure 7:
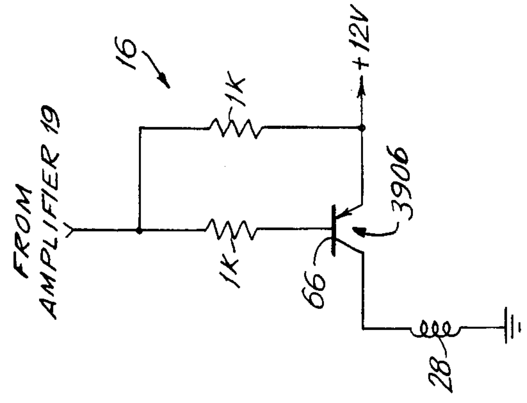
FIG. 7 is a detailed circuit diagram of the fiducial firing circuit schematically depicted in FIGS. 1 and 4.

FIG. 7 is a circuit diagram of the fiducial firing circuit 16 in accordance with the invention. Because of the close proximity of the fiducial coil 28 to the delay line 22, the fiducial coil does not require a large current in order to produce a useable pulse in the delay line. Therefore, the fiducial firing circuit 16 comprises a simple transistor 66 for firing the fiducial coil 28 in response to a signal from amplifier 19.

Figure 10:
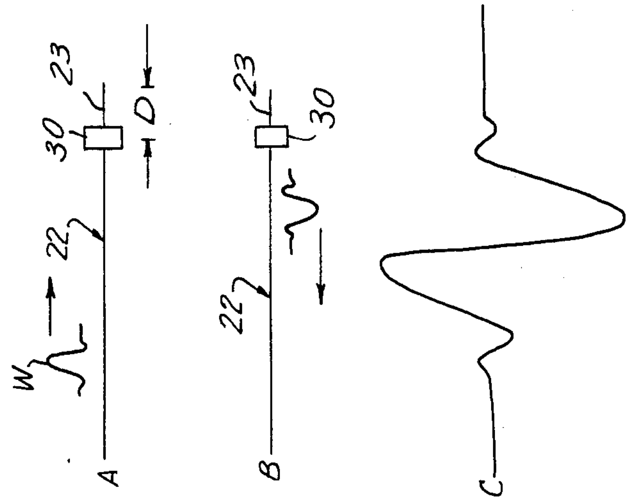
FIG. 10 is a diagrammatic depiction of an induced strain wave propagating toward the sensor coil (A), a reflected strain wave propagating from the end of the magnetostrictive element (B), and the summed induced and reflected strain waves as sensed by the sensor coil (C).
Figure 8:
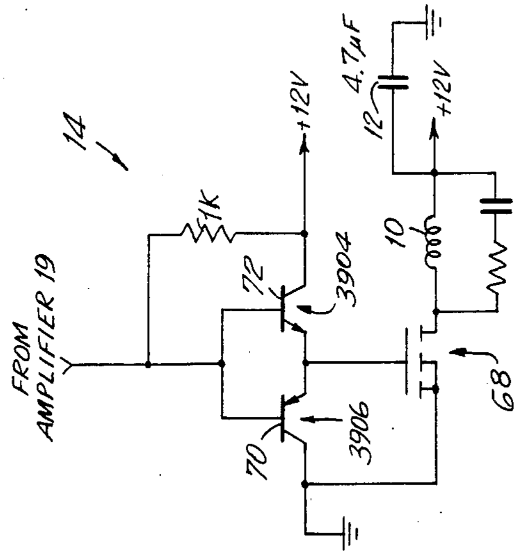
FIG. 8 is a detailed circuit diagram of the cursor firing circuit schematically depicted in FIGS. 1 and 4.

FIG. 8 is a circuit diagram of the cursor firing circuit 14 in accordance with the invention. The prior art cursor firing circuit comprised a silicon controlled rectifier, the anode of which is connected to a charging capacitor. In the cursor firing circuit or pointer pulser of the present invention, these components have been replaced by a power MOSFET 68. The use of a MOSFET greatly enhances the current pulse applied across the pointer, as a result of which the pointer yields greater signal amplitude. In addition, the silicon controlled rectifier circuit of the prior art greatly reduced the sample rate. As shown in FIG. 10, the cursor firing circuit comprises series-connected transistors 70 and 72 having their bases connected to a common junction 80, and power MOSFET 68 having terminals connected to junctions 74, 76, and 78. Power MOSFET 68 pulses the flux-producing element 10 in response to the receipt of an output signal from amplifier 19.

An embodiment suitable for performing simultaneous coordinate determination is depicted in FIG. 10. In this embodiment the preamplifier 32 will output respective amplified pulses in response to detection of the arriving strain waves by sensor coil 30. In response to receipt of each amplified pulse, the threshold discriminator 38 will output first and second STOP COUNTER signals to the counters 42 and 42' The counters 42 and 42' are controlled by the CPU 74 such that both start to count in response to a START COUNTER signal output by CPU 74 simultaneously with the TRIGGER signal output to the cursor firing circuit 14. Counter 42 will stop counting in response to receipt of the first STOP COUNTER signal from threshold discriminator 38, i.e. counter 42 does not receive an INHIBIT signal from CPU 74. The second STOP COUNTER signal from threshold discriminator 38 will have no effect on counter 42. Counter 42' is inhibited from stopping its counting upon receipt of the first STOP COUNTER by the INHIBIT signal (see FIG. 8) output by CPU 74. As can be seen in FIG. 11, the STOP COUNTER pulses are also sent to CPU 74, which is programmed to output the INHIBIT signal to counter 42' only during the time interval from the time of output of the TRIGGER signal to the time of receipt by CPU 74 of the first STOP COUNTER signal (i.e. from $t_0$ to $t_x$). After the first STOP COUNTER signal has been received by CPU 74, the inhibit line to counter 42' is disabled and counter 42' will stop counting in response to receipt of the next (i.e. second) STOP COUNTER signal. It should also be pointed out that the counter 42 can receive an INHIBIT signal from CPU 74 during the time interval from $t_0$ to $t_{refx}$, for example, in order to mask the sensor coil pulse induced directly by the pulsed pointer, as previously described. The first and second counts ($N_1$ and $N_2$) attained by respective counters 42 and 42' are output to CPU 74, which processes this data in accordance with equations (1) and (2) to obtain the X and Y coordinates of the pulsed pointer 8.

Figure 9:
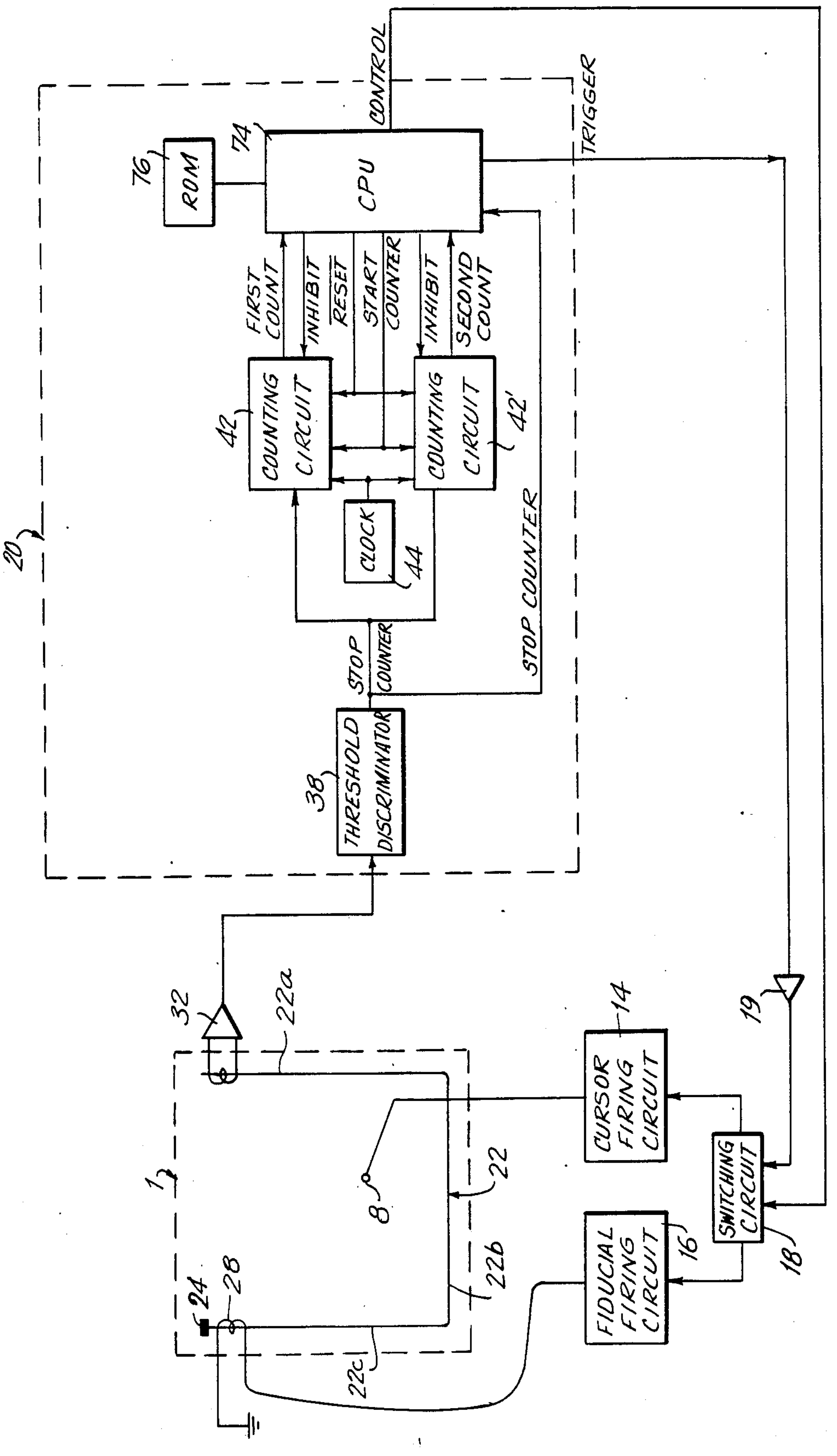
FIG. 9 is a combined bottom view of the data tablet and schematic depiction of the associated electrical circuitry in accordance with a second embodiment for simultaneous coordinate determination.

As previously described, the embodiments depicted in FIGS. 4 and 10 have only one damping block. The end on which sensor coil 30 is arranged is suspended freely in space to enable "tuning" of the delay line. Because the free end 23 (see FIG. 9A) of the delay line 22 is not mounted in a damping block, the incoming strain wave W will be reflected from the free end, and will propagate through the sensor coil 30 and toward the damping block 24 at the opposite end. By adjusting the length D of the free end 23 extending beyond the sensor coil 30, the reflected strain wave can be added to the incoming strain wave such that the signal peak-to-peak amplitude of the wave sensed by sensor coil 30 is doubled, thereby increasing proximity.

The length of delay line 22 which extends beyond the sensor coil 30 is directly proportional to the pulse width $I_c$ of the current pulse which excites the cursor. The rule of thumb formula is that for each microsecond of current pulse width, 3/32 inch of delay line must extend beyond the sensor coil (as measured from the center of the sensor coil). Thus, if $I_c=2$ microseconds, then D must equal 3/16 inch.

This phenomenon occurs because the reflected waveform is 180° out of phase with respect to the incoming waveform. By selecting an appropriate length D for free end 23, the waves can be "tuned" such that the trailing edge of the incoming wave and the leading edge of the reflected wave will add together, yielding one pulse with a greater peak-to-peak amplitude (see FIG. 9C).

In the preferred embodiment, $V_{prop}=5000$ meters/second$=0.01$ inch in 50 nanoseconds. If the current pulse width $I_c=2$ microseconds, then the distance d traveled by the propagating strain wave during this time equals 0.4 inch. Using the relationship $d=2D$, we get that $D \approx 3/16$ inch.

The foregoing description of the preferred embodiments is presented for illustrative purposes and is not intended to limit the scope of the invention as defined in the appended claims. Modifications may be readily effected by one having ordinary skill in the art without departing from the spirit and scope of the inventive concept herein disclosed.

What is claimed is:

1. A data tablet for a position coordinate determination device comprising:

(a) a grid network of electrical conductors including a first plurality of parallel equidistantly spaced conductors and a second plurality of parallel equidistantly spaced conductors, said first plurality and said second plurality being coplanar and respectively substantially perpendicular to first and second coordinate axes, said first and second coordinate axes being coplanar and non-parallel;

(b) a magnetostrictive means having first and second substantially linear portions and a third portion, said first and second substantially linear portions and said third portion being operatively coupled in series to transmit propagating waves, said first linear portion being proximally arranged with respect to said first plurality of conductors and said second linear portion being proximally arranged with respect to said second plurality of conductors such that said first and second linear portions are capable of being inductively coupled with at least one of said first plurality of conductors and with at least one of said second plurality of conductors respectively, and said third portion being arranged such that said third portion is not capable of being inductively coupled to any one of said first and second pluralities of conductors; and (c) a sensing means proximally arranged at a reference position with respect to said third portion and capable of being inductively coupled with said third portion such that said sensing means outputs a signal in response to the arrival of a propagating wave in said third linear portion at said reference position.

2. The data tablet of claim 1, wherein said third portion of said magnetostrictive means is linear.

3. The data tablet of claim 2, wherein said first, second and third linear portions are connected by first and second non-linear portions such that in response to the induction of a current in one of said first plurality of conductors, a first wave is generated in said magnetostrictive means which propagates from said first to said second to said third linear portions in series, and in response to the induction of a current in one of said second plurality of conductors, a second wave is generated in said magnetostrictive means which propagates from said second to said third linear portions, said sensing means outputting a signal in response to the arrival of each of said first and second waves at said reference position.

4. The data tablet of claim 3, wherein said third linear portion has a free end, said reference position being adjacent said free end.

5. The data tablet of claim 3, wherein said first linear portion has an end mounted in a damping means, said damping means serving to prevent the reflection of propagating waves from the end of said first linear portion.

6. The data tablet of claim 1, wherein said sensing means comprises an inductive coil wrapped around said magnetostrictive element.

7. The data tablet of claim 1, wherein said sensing means comprises a piezoelectric transducer.

8. A position coordinate determination device comprising:

(a) a grid network of electrical conductors including a first plurality of perallel equidistantly spaced conductors and a second plurality of parallel equidistantly spaced conductors, said first plurality and said second plurality being coplanar and respectively substantially perpendicular to first and second coordinate axes, said first and second coordinate axes being coplanar and non-parallel;

(b) a magnetostrictive means having first and second substantially linear portions and a third portion, said first and second substantially linear portions and said third portion being operative coupled in series to transmit propagating waves, said first linear portion being proximally arranged with respect to said first plurality of conductors and said second linear portion being proximally arranged with respect to said second plurality of conductors such that said first and second linear portions are capable of being inductively coupled to at least one of said first plurality of conductors and to at least one of said second plurality of conductors respectively, and said third portion being arranged such that said third portion is not capable of being inductively coupled to any one of said first and second pluralities of conductors;

(c) a sensing means proximally arranged at a reference position with respect to and capable of being inductively coupled to said third portion such that said sensing means outputs a signal in response to the arrival of a propagating wave in said third linear portion at said reference position;

(d) a pulsing means for outputting a first current pulse; and (e) a flux-producing means electrically connected to said pulsing means for producing a magnetic flux in response to said first current pulse and proximally arranged to enable inductive coupling of said flux-producing means to said grid network, wherein said sensing means outputs first and second signals in response to the arrival of first and second propagating waves at said reference position, said first propagating wave being generated in said first linear portion in response to a second current pulse in one of said first plurality of conductors, said second propagating wave being generated in said second linear portion in response to a third current pulse in one of said second plurality of conductors, said second and third current pulses being generated in response to said magnetic flux produced by said flux-producing means in response to the output of said first current pulse by said pulsing means.

9. The position coordinate determination device of claim 8, wherein said third portion of said magnetostrictive means is linear.

10. The position coordinate determination device of claim 9 wherein said first, second and third linear portions are connected by first and second non-linear portions such that in response to the induction of said second current pulse in said one of said first plurality of conductors, said first propagating wave is generated in said magnetostrictive means which propagates from said first to said second to said third linear portions in series, and in response to the induction of said third current pulse in said one of said second plurality of conductors, said second propagating wave is generated in said magnetostrictive means which propagates from said second to said third linear portions.

11. The position coordinate determination device of claim 10, further comprising counting means operatively connected to begin counting in response to the output of a current pulse by said pulsing means, wherein said counting means is operatively connected to stop counting in response to the output of a pulsed signal by said sensing means.

12. The position coordinate determination device of claim 11, further comprsing memory means for storing a program and calculating means for performing a calculation in accordance with said program, said calculating means being connected to receive signals repFesenting said stopped count from said counting means, wherein said program enables said calculating means to calculate a first position coordinate of a pointer relative to said first coordinate axis from the value of said stopped count, said pointer having said flux-producing means incorporated therein.

13. The position coordinate determination device of claim 11, further comprising amplifying means for amplifying the output by said sensing means, and detecting means connected to said amplifying means and to said counting means for detecting an amplified signal having a characteristic value greater than a predetermined threshold value and outputting a stop counter signal to said counting means in response to said detection.

14. The position coordinate determination device of claim 10, further comprising first and second counting means operatively connected to begin counting in response to the output of a current pulse by said pulsing means, wherein said first and second counting means are operatively connected to stop counting in response to the detection of said first and second waves respectively by said sensing means.

15. The position coordinate determination device of claim 14 further comprising amplifying means for amplifying the signal output by said sensing means, and detecting means connected to said amplifying means and to said first and second counting means for detecting an amplified signal having a threshold value and outputting a stop counter signal to said first and second counting means in response to said detection.

16. The position coordinate determination device of claim 15, comprising read only memory means for storing a program and calculating means for performing a calculation in accordance with said program, said calculating means being connected to receive respective signals representing said stopped counts from said first and second counting means, wherein said program enables said calculating means to calculate first and second position coordinates of said pointer relative to said first and second coordinate axes from the first and second values of said stopped counts respectively.

17. The position coordinate determination device of claim 10, further comprising calculating means for outputting start counter signals and an inhibit signal in accordance with a predetermined routine and counting means operatively connected to begin counting in response to the output of a start counter signal by said calculating means, wherein said counting means is operatively connected to stop counting in response to the output of a pulsed signal by said sensor means only if said calculating means is not outputting an inhibit signal.

18. The position coordinate determination device of claim 17, further comprising amplifying means for amplifying the signal output by said sensing means, and detecting means connected to said amplifying means and to said counting means for detecting an amplified signal having a characteristic value greater than a predetermined threshold value and outputting a stop counter signal to said counting means in response to said detection.

19. A data tablet for a position coordinate determination device comprising::

(a) a grid network of electrical conductors including a first plurality of parallel equidistantly spaced conductors and a second plurality of parallel equidistantly spaced conductors, said first plurality and said second plurality being coplanar and respectively substantially perpendicular to first and second coordinate axes, said first and second coordinate axes being coplanar and non-parallel;

(b) a magnetostricitive means having a first portion proximally arranged with respect to said first plurality of conductors and a second portion proximally arranged with respect to said second plurality of conductors whereby said first and second portios are capable of being inductively coupled with at least one of said first plurality of conductors and with at least one of said second plurality of conductors respectively, each of said first and second portions having first and second ends, a third portion connecting said first ends of said first and second portions, and a fourth portion connected to said second end of said second portion, said third and fourth portions being arranged to be incapable of being inductively coupled with any one of said electrical conductors; and (c) a sensing means proximally arranged at a reference postion with respect to said fourth portion and capable of being inductively coupled with said fourth portion such that said sensing means outputs a signal in response to the arrival of a propagating wave in said fourth portion at said reference position.

* * * * *